United States Patent Office 3,701,779
Patented Oct. 31, 1972

3,701,779
PYRIDINE CARBAMATES
Cyril Donninger, East Sutton, and John A. Schofield and John E. Hawes, Kent, England, assignors to Shell Oil Company, New York, N.Y.
No Drawing. Filed Nov. 3, 1970, Ser. No. 86,635
Claims priority, application Great Britain, Nov. 7, 1969, 54,653/69
Int. Cl. C07d 31/50
U.S. Cl. 260—294.8 G                4 Claims

ABSTRACT OF THE DISCLOSURE

Certain novel 3-pyridyl carbamates, useful as insecticides, fungicides and nematocides.

BACKGROUND OF THE INVENTION

Field of the invention

This invention relates to novel substituted pyridine derivatives, which possess high insecticidal, fungicidal and nematocidal activity.

Description of the prior art

No art is known which would anticipate the substituted 3-pyridyl carbamates of this invention. U.S. Pat. 3,409,624 discloses a series of ring substituted 2-nitro-3-pyridol esters including carbamate esters which are useful as herbicides.

SUMMARY OF THE INVENTION

A new series of 3-pyridyl carbamates substituted in the 2-position on the ring with an ether or thioether moiety, optionally attached to the ring by way of an alkylene bridge, or alternatively in the 2-position with 5-6 membered heterocycle containing carbon and one of oxygen or sulfur, with further optional ring substitution by an alkyl moiety have been discovered. These novel compounds have shown high activity in the control of certain economically important insects and nematodes which attack crops and have proven effective in the control of certain fungal diseases.

The invention, accordingly, is the novel 3-pyridyl carbamates hereinbefore described, their use as pesticides and pesticidal formulations containing them.

DESCRIPTION OF THE PREFERRED EMBODIMENTS

The novel compounds of this invention can be described by the general Formula I

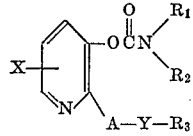

I wherein $R_1$, $R_2$ and X each individually represents hydrogen or alkyl of up to 8 carbon atoms; $R_3$ is alkenyl of up to 6 carbon atoms or alkyl of up to 6 carbon atoms which may be substituted with a cyano moiety; A represents a covalent bond or an alkylene group of up to 3 carbon atoms which may be substituted with alkoxy of up to 6 carbon atoms or alkylthio of up to 6 carbon atoms; and Y is oxygen or sulfur; A, Y and $R_3$ together may form a 5 to 6 membered heterocyclic ring wherein the members of the ring are selected from carbon, oxygen and sulfur with the proviso that the members of the ring other than carbon do not exceed one. Any of these alkyl groups can be of either branched-chain or straight-chain configuration.

Preferred compounds are those wherein $R_1$ and X each represents a hydrogen atom or an alkyl group of 1-6 carbon atoms, especially methyl; $R_2$ represents an alkyl group of 1-6 carbon atoms, especially methyl; $R_3$ represents an optionally cyano-substituted alkyl group of up to 6 carbon atoms, particularly methyl, ethyl, cyanoethyl, propyl, cyanopropyl or butyl, or an alkenyl group, particularly allyl; A represents a covalent bond or a methylene group optionally substituted by an alkoxy group, for example methoxy, or by an alkylthio group, for example isopropylthio; Y represents an oxygen or sulphur atom, or A, Y and $R_3$ together form a 5-membered heterocyclic ring system, particularly dioxolane or dithiolane.

The following compounds are particularly preferred:

2-methylthio-3-(N-methylcarbamoyloxy)pyridine
2-(2-cyanoethylthio)-3-(N-methylcarbamoyloxy) pyridine
2-methoxy-3-(N-methylcarbamoyloxy)pyridine The novel 3-pyridyl carbamates of Formula I may be prepared by a process which comprises reacting a 3-hydroxypyridine derivative of formula

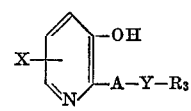

II with a carbamoyl halide of formula:

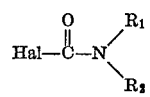

III wherein Hal represents a halogen, preferably chlorine, atom, with phosgene and the appropriate amine, or, when $R_1$ represents a hydrogen atom, with an organic isocyanate of formula

$$R_2\text{—N}=\text{C}=\text{O} \qquad \text{IV}$$

preferably in the presence of an organic base suitably an aliphatic tertiary amine such as triethylamine. The reaction is suitably carried out in an organic solvent such as dichloromethane.

The starting material of Formula II wherein A represents a covalent bond and Y represents a sulphur atom may be obtained from a 3-hydroxypyridine-1-oxide of formula

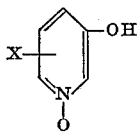

with a thiol of the formula:

$$R_3SH \qquad VI$$

using one or other of the standard procedures described in the chemical literature.

The starting material of Formula II wherein A represents a methylene group and Y represents a sulphur atom may be obtained by reacting a 2-halomethyl pyridine derivative of formula

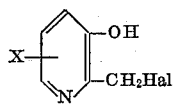

wherein Hal represents a halogen, preferably bromine, atom, with a thiol of Formula VI in the presence of a base suitably an alkali metal alkoxide such as sodium ethoxide. The halomethyl derivative is suitably used in the form of a salt, for example as the hydrobromide.

The starting material of Formula II wherein A represents a methylene group substituted by alkoxy or alkylthio, or A, Y and $R_3$ together form a dioxolane or dithiolane ring system are prepared by reacting a 3-hydroxypyridine-2-aldehyde with the appropriate alcohol, alkylthiol, alkane diol or alkane dithiol in the presence of an acid catalyst, for example hydrochloric acid.

The starting material of Formula II wherein A represents a covalent bond and Y represents an oxygen atom may be prepared by reacting the appropriate 2-halo-3-hydroxypyridine with an alkali metal derivative of formula

$$R_3O \ Met$$

wherein Met represents an alkali metal, suitably sodium, atom.

The compound of the invention exhibit interesting pesticidal activity particularly against insects, nematodes and fungi and the invention includes therefore with its scope pesticidal compositions comprising a carrier or a surface-active agent, or both a carrier and a surface-active agent and, as active ingredient, at least one pyridine derivative of the invention. Likewise the invention includes also a method of protecting crops at a locus from attack by insects and/or nematodes and/or fungal diseases which comprises applying to the locus a pesticidally effective amount of a pyridine derivative or composition of the invention.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier my be a solid or a fluid. Any of the material usually applied in formulating pesticides may be used as carrier.

Suitable solid carriers are natural and synthetic clays and silicates for example natural silicas such as diatomacious earths; magnesium silicates, for example, talcs; magnesium aluminum silicates, for example attapulgites and vermiculites; aluminum silicates, for example, kaolinites montmorillonites and micas; calcium carbonate; calcium sulphate; synthetic hydrated silicon oxides and synthetic calcium or aluminum silicates; elements such as for example, carbon and sulphur; natural and synthetic resins such as for example, coumarone resins, polyvinyl chloride and styrene polymers and copolymers; solid polychlorophenols; bitumen; waxes such as for example, beeswax, paraffin wax, and chlorinated mineral waxes; and solid fertilizers, for example superphosphates.

Examples of suitable fluid carriers are water, alcohols, such as for example, isopropanol, glycols; ketones such as for example, acetone, methyl ethyl ketone, methyl isobutyl ketone and cyclohexanone; ether; aromatic hydrocarbons such as for example, benzene, toluene and xylene; petroleum fractions such as for example, kerosene, light mineral oils; chlorinated hydrocarbons, such as for example, carbon tetrachloride, perchloroethylene, trichloroethane, including liquefied normally vaporous gaseous compounds. Mixtures of different liquids are often suitable.

The surface-active agent may be an emulsifying agent or a dispersing agent or a wetting agent; it may be nonionic or ionic. Any of the surface-active agents usually applied in formulating herbicides or insecticides may be used. Examples of suitable surface-active agents are the sodium or calcium salts of polyacrylic acids and lignin sulphonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or alkyl phenols for example p-octylphenol or p-octylcresol, with ethylene oxide and/or propylene oxide; sulphates or sulphonates of these condensation products; alkali or alkaline earth metal salts, preferably sodium salts, of sulphuric or sulphonic acid esters containing at least 10 carbon atoms in the molecule, for example, sodium lauryl sulphate, sodium secondary alkyl sulphates, sodium salts of sulphonated castor oil, and sodium alkylaryl sulphonates such as sodium dodecylbenzene sulphonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounded to contain 25, 50 or 75% w. of toxicant and usually contain, in addition to solid carrier, 3–10% w. of a dispersing agent and, where necessary, 0–10% w. of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% w. of toxicant. Granules are usually prepared to have a size between 10 and 100 BS mesh, and may be manufactured by agglomeration or impregnation techniques. Generally, granules will contain ½–25% w. toxicant and 0–10% w. of additives such as stabilizers, slow release modifiers and binding agents. Emusifiable concentrates usually contain, in addition to the solvent and, when necessary, co-solvent, 10–50% w./v. toxicant, 2–20% w./v. emulsifiers and 0–20% w./v. of appropriate additives such as stabilizers, penetrants and corrosion inhibitors. Suspension concentrates are compounded so as to obtain a stable, non-sedimenting, flowable product and usually contain 1075% w. toxicant, 0.5(15% w. of dispersing agents, 0.1–10% w. of suspending agents such as protective colloids and thixotropic agents, 0–10% w. of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentatoin or as antifreeze agents for water.

The compositions of the invention may contain other ingredients, for example, protective colloids such as gelatin, glue, casein, gums, cellulose ethers, and polyvinyl alcohol; thixotropic agents e.g. bentonites, sodium polyphosphates; stabilizers such as ethylene diamine tetra-acetic acid, urea, triphenyl phosphate; other pesticides or herbicides; and stickers, for example non-volatile oils.

Aqueous dispersion and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The invention is further illustrated in the following examples, in which all temperatures are given in degrees centigrade.

EXAMPLE I

2-t-butylthio-3-(N-methylcarbamoyloxy)pyridine

Methyl isocyanate (0.5 g.) was added to a solution of 2-t-butylthio-3-hydroxypyridine (1.4 g.) in dichloromethane (30 ml.). Triethylamine (2 drops) was added, the mixture allowed to stand overnight at room temperature and then evaporated to dryness. The residue was recrystallized from light petroleum (B.P. 60–80°) to give the required product having a M.P. 61–62°. The product may also be obtained in a different crystalline form having a M.P. 84–85°.

Analysis.—Calculated for $C_{11}H_{16}N_2O_2S$ (percent): C, 55.0; H, 6.7; N, 11.7. Found (percent): C, 55.0; H, 6.6; N, 11.5.

EXAMPLE II

2-methylthio-3-(N-methylcarbamoyloxy)pyridine

Dimethyl sulphate (105 ml.) was added to 3-hydroxypyridine-1-oxide (111 g.) and the mixture heated at 120° for 2 hours with stirring, and then allowed to stand overnight at room temperature. The mixture was washed with ethyl acetate (2× 100 ml.) and the residual oil evacuated under high vacuum and finally dissolved in dimethylformamide. The solution was cooled in ice and stirred while a solution containing sodium methyl mercaptide (formed from sodium (25 g.) and methyl mercaptan (61 ml.)) in dimethylformamide (200 ml.) was added dropwise. The mixture was then stirred for 1 hour at room temperature, for 2 hours at 70° and then evaporated to dryness under reduced pressure. Water (1 l.) was added to the residue and the mixture allowed to stand overnight at 4°. The mixture was then filtered and the crude product obtained was recrystallized from a chloroform/methanol mixture to give 2-methylthio - 3 - hydroxypyridine having a M.P. 150–152°.

Analysis.—Calculated for $C_6H_7NOS$ (percent): C, 51.1; H, 5.0; N, 9.7; S, 22.7. Found (percent): C, 50.6; H, 4.9; N, 9.7; S, 22.7.

Following a procedure similar to that of Example I the 2-methylthio-3-hydroxypyridine was carbamoylated to give the desired product having a M.P. 110–111°.

Analysis.—Calculated for $C_8H_{10}N_2O_2S$ (percent): C, 48.5; H, 5.1; N, 14.1; S, 16.2. Found (percent): C, 48.5; H, 5.3; N, 14.3; S, 15.8.

EXAMPLE III

2-methylthiomethyl-3-(N-methylcarbamoyloxy)pyridine

Methyl mercaptan (10 ml.) was added to a stirred solution of sodium (1.84 g.) in ethanol (75 ml.), 2-bromomethyl-3-hydroxypyridine hydrobromide (7.0 g.) added portionwise and the mixture refluxed for 2 hours. Solvent was removed by distillation under reduced pressure, water (50 ml.) was added and the pH adjusted to 5 by addition of acetic acid. The product was isolated by ether extraction and recrystallized from light petroleum (B.P. 60–80°)-ethanol to give the required material having a M.P. 151–152°.

Analysis.—Calculated for $C_7H_9NOS$ (percent): C, 54.2; H, 5.8; N, 9.0; S, 20.6. Found (percent): C, 54.1; H, 6.1; N, 8.8; S, 20.4.

Following a procedure similar to that of Example I the 2 - methylthiomethyl - 3 - hydroxypyridine was carbamoylated to give the desired product having a M.P. 63–64° C.

Analysis.—Calculated for $C_9H_{12}N_2O_2S$ (percent): C, 50.9; H, 5.7; N, 13.2; S, 15.1. Found (percent): C, 51.3; H, 5.7; N, 13.2; S, 15.3.

EXAMPLE IV

2-(1,3-dithiolan-2-yl)-3-(N-methylcarbamoyloxy)pyridine

Dry hydrogen chloride gas was passed for 15 minutes into a solution of 3-hydroxypyridine-2-aldehyde (6.6 g.) in ethane dithiol (20 ml.) and the solution was allowed to stand overnight at room temperature. Dry methanol (20 ml.) was added to the solution which was then saturated with dry hydrogen chloride. The solution was evaporated to dryness under reduced pressure and the residue neutralized with saturated aqueous sodium bicarbonate solution. The mixture was filtered and both the precipitate and filtrate were extracted with chloroform (2× 100 ml.). The combined extracts were dried over anhydrous sodium sulphate and evaporated to dryness to leave a residue which, on recrystallization from ethanol/light petroleum (B.P. 100–120°) yielded 2-(1,3-dithiolan - 2 - yl) - 3 - hydroxypyridine having a M.P. 195–198°.

Analysis.—Calculated for $C_8H_9NOS_2$ (percent): C, 48.2; H, 4.5; N, 7.0; S, 32.2. Found (percent): C, 47.6; H, 4.5; N, 6.6; S, 32.0.

Following a procedure similar to that of Example I the pyridol was carbamoylated to give the desired product having a M.P. 129–130°.

Analysis.—Calculated for $C_{10}H_{12}N_2O_2S$ (percent): C, 46.9; H, 4.7; N, 10.9; S, 25.0. Found (percent): C, 47.1; H, 4.7; N, 10.5; S, 25.0.

EXAMPLE V

2-methoxy-3-(N-methylcarbamoyloxy)pyridine 2-iodo-3-hydroxypyridine (3.4 g.) was added to a solution of sodium (0.935 g.) in methanol (50 ml.) and the mixture heated in an autoclave at 150° for 10 hours. The solvent was then evaporated and the residue was acidified with acetic acid and extracted with ether (3× 50 ml.). The dried ($Na_2SO_4$) extract was evaporated and the residue recrystallized from benzene to give the 2-methoxy-3-hydroxypyridine having a M.P. 65–68°.

Following a procedure similar to that of Example I the 2-methoxy-3-hydroxypyridine was carbamoylated to give the desired product having a M.P. 87–88°.

Analysis.—Calculated for $C_8H_{10}N_2O_3$ (percent): C, 52.7; H, 5.5; N, 15.4. Found (percent): C, 52.5; H, 5.6; N, 15.1.

EXAMPLE VI

2-methylthio-3-(N,N-dimethylcarbamoyloxy)pyridine 2-methylthio-3-hydroxypyridine (3.06 g., prepared as in Example II) and triethylamine (2.02 g.) in benzene (30 ml.) were heated under reflux with stirring while dimethylcarbamoyl chloride (2.15 g.) was added over 10 minutes. The mixture was heated under reflux for a further 6 hours and then filtered. The solvent was removed from the filtrate under reduced pressure and the residue purified by chromatography on silica gel using chloroform as eluant, followed by fractional distillation to give the desired product having a B.P. 128–130° at 0.15 mm. Hg.

Analysis.—Calculated for $C_9H_{12}N_2O_2S$ (percent): C, 50.9; H, 5.7; N, 13.2; S, 15.1. Found (percent): C, 50.6; H, 5.6; N, 13.3; S, 15.4.

EXAMPLE VII

Following procedures similar to those given in previous examples further compounds were prepared, whose physical characteristics and analyses are set out in Table 1.

TABLE 1

| Compound | Melting point, °C. | | Analysis, percent | | | |
|---|---|---|---|---|---|---|
| | | | C | H | N | S |
| 2-ethylthio-3-(N-methylcarbamoyloxy) pyridine | 80–81 | Calculated for $C_9H_{12}N_2O_2S$ | 50.9 | 5.7 | 13.2 | 15.1 |
| | | Found | 51.0 | 5.6 | 13.2 | 15.3 |
| 2-ethylthiomethyl-3-(N-methylcarbamoyloxy) pyridine | 90 | Calculated for $C_{10}H_{14}N_2O_2S$ | 53.1 | 6.2 | 12.4 | 14.2 |
| | | Found | 53.0 | 6.3 | 12.2 | 14.1 |
| 2-isopropylthiomethyl-3-(N-methylcarbamoyloxy) pyridine | 59–61 | Calculated for $C_{11}H_{16}N_2S$ | 55.0 | 6.7 | | 13.3 |
| | | Found | 55.2 | 7.0 | | 13.3 |
| 2-t-butylthio-6-methyl-3-(N-methylcarbamoyloxy) pyridine | 90–91 | Calculated for $C_{12}H_{18}N_2O_2S$ | 56.7 | 7.1 | 11.0 | 12.6 |
| | | Found | 57.1 | 7.0 | 11.4 | 12.3 |
| 2-ethoxy-3-(N-methylcarbamoyloxy)pyridine | 78–79 | Calculated for $C_9H_{12}N_2O_3$ | 55.1 | 6.1 | 14.3 | |
| | | Found | 54.8 | 6.3 | 14.4 | |
| 2-isopropoxy-3-(N-methylcarbamoyloxy) pyridine | 114–115 | Calculated for $C_{10}H_{14}N_2O_3$ | 57.1 | 6.7 | 13.3 | |
| | | Found | 57.4 | 6.7 | 13.3 | |
| 2-allylthio-3-(N-methylcarbamoyloxy) pyridine | 71–72 | Calculated for $C_{10}H_{12}N_2O_2S$ | 53.6 | 5.4 | 12.4 | 14.3 |
| | | Found | 53.6 | 5.1 | 12.1 | 13.9 |
| 2-bis(isopropylthio)methyl-3-(N-methylcarbamoyloxy) pyridine | 136–137 | Calculated for $C_{14}H_{22}N_2O_2S_2$ | 53.5 | 7.0 | 8.9 | 20.4 |
| | | Found | 53.4 | 7.0 | 8.6 | 20.0 |
| 2-(1,3-dioxolan-2-yl)-3-(N-methylcarbamoyloxy)pyridine | 84–86 | Calculated for $C_{10}H_{12}N_2O_4$ | 53.6 | 5.4 | 12.5 | |
| | | Found | 54.0 | 5.4 | 12.4 | |
| 2-dimethoxymethyl-3-(N-methylcarbamoyloxy) pyridine | 40–41 | Calculated for $C_{10}H_{14}N_2O_4$ | 53.1 | 6.2 | 12.4 | |
| | | Found | 52.8 | 6.1 | 12.0 | |
| 2-(3-cyanopropylthio)-3-(N-methylcarbamoyloxy) pyridine | 98–99 | Calculated for $C_{11}H_{13}N_3O_2S$ | 52.6 | 5.2 | 16.7 | |
| | | Found | 52.6 | 5.2 | 16.7 | |
| 2-(2-cyanoethylthio-3-(N-methylcarbamoyloxy) pyridine | 83–85 | Calculated for $C_{10}H_{11}N_3O_2S$ | 50.6 | 4.6 | 17.7 | |
| | | Found | 50.7 | 4.7 | 17.5 | |

EXAMPLE VIII

Insecticidal activity

The insecticidal activity of the compounds of the invention was tested as follows:

(I) A 1.0% by weight solution in acetone of the compound to be tested was prepared, and taken up in a micrometer syringe. Two to three-day old adult female house flies (*Musca domestica*) were anesthetized with carbon dioxide, and a 1 μl drop of the test solution was brushed off on the ventral abdomen of each, 20 flies being treated. The treated flies were held for 24 hours in glass jars, each containing a little granulated sugar as food for the flies, and the percentage of dead and moribund individuals was then recorded.

(II) A quantity of 0.1 ml. of a 1.0% by weight solution of the compound to be tested in acetone was mixed in a beaker with 100 ml. of water. Twenty 5–6 day-old (4th instar) mosquito larvae (*Aedes aegypti*) were added and the beakers stored for 24 hours. The percentage of dead and moribund larvae was then recorded.

(III) The compounds were formulated as solutions or suspensions in water containing 20% by weight of acetone and 0.05% by weight of Triton X 100 as wetting agent. The formulations contained 0.7% by weight of the compound to be treated. Turnip and broad bean plants, trimmed to one leaf each, were sprayed on the under surface of the leaf with the above formulation. Spraying was effected with a spraying machine delivering 40 gallons per acre, the plants passing under the spray on a moving belt. Ten 4th instar (8-day-old) diamondback moth larvae (*Plutella maculipennis*) or ten adult 1–2 week-old mustard beetles (*Phaedon cochleariae*) were placed on the sprayed leaf of each turnip plant and ten apterous (6-day-old) vetch aphids (*Megoura viciae*) were placed on the sprayed leaf of each broad bean plant. The plants were then enclosed in glass cylinders fitted at one end with a muslin cap. Mortality counts were made after 24 hours.

(IV) In tests against glass house spider mites (*Tetranychus urticae*), leaf discs cut from French bean plants were sprayed in the manner described under III. 1 hour after spraying, the discs were inoculated with 10 adult mites. Mortality counts were made 24 hours after inoculation.

(V) In tests against large white butterfly larvae (*Pieris brassicae*), leaf discs cut from cabbage leaves were sprayed in the manner described under III. 10 3rd instar (8–10 day-old) larvae were placed on the discs within petri-dish pairs. Mortality counts were made 24 hours after inoculation.

The results of these tests are shown in Table 2, in which A denotes complete kill, B some kill, and C no kill of the test insects.

TABLE 2

| Compound | Insecticidal activity | | | | | | |
|---|---|---|---|---|---|---|---|
| | M. domestica | A. aegypti | P. cochleariae | P. maculipennis | P. brassicae | M. viciae | T. urticae |
| 2-t-butylthio-3-(N-methylcarbamoyloxy)pyridine | A | A | A | A | A | A | A |
| 2-ethylthio-3-(N-methylcarbamoyloxy) pyridine | A | C | A | B | A | A | A |
| 2-methylthiomethyl-3-(N-methylcarbamoyloxy) pyridine | B | C | C | C | C | A | A |
| 2-isopropylthiomethyl-3-(N-methylcarbamoyloxy) pyridine | A | C | C | C | C | B | A |
| 2-ethylthiomethyl-3-(N-methylcarbamoyloxy) pyridine | B | C | C | C | C | A | A |
| 2-methoxy-3-(N-methylcarbamoyloxy) pyridine | A | C | A | A | A | A | A |
| 2-isopropylthio-6-methyl-3-(N-methylcarbamoyloxy) pyridine | A | A | A | A | A | A | A |
| 2-methylthio-3-(N-N,dimethylcarbamoyloxy) pyridine | A | C | B | C | A | A | C |
| 2-(2-cyanoethylthio)-3-(N-methylcarbamoyloxy) pyridine | A | C | B | B | B | A | A |
| 2-ethoxy-3-(N-methylcarbamoyloxy) pyridine | A | C | A | A | B | A | A |
| 2-isopropoxy-3-(N-methylcarbamoyloxy) pyridine | A | A | A | B | A | A | C |
| 2-(1,3-dithiolan-2-yl)-3-(N-methylcarbamoyloxy) pyridine | A | C | C | C | C | C | A |
| 2-bis(isopropylthio) methyl-3-(N-methylcarbamoyloxy) pyridine | C | C | C | C | C | A | B |
| 2-(1,3-dioxolan-2-yl)-3-(N-methylcarbamoyloxy) pyridine | A | C | B | B | C | A | A |
| 2-allythio-3-(N-methylcarbamoyloxy) pyridine | A | B | A | A | A | A | A |
| 2-dimethoxymethyl-3-(N-methylcarbamoyloxy) pyridine | A | C | B | C | C | A | A |
| 2-methylthio-3-(N-methylcarbamoyloxy) pyridine | A | B | A | A | A | A | A |

EXAMPLE IX

Nematocidal activity

The nematocidal activity of the compounds was tested as follows:

Stock solutions of the test compounds were prepared containing 1,000 p.p.m. of the compound in water containing 1% acetone. Each solution was further diluted to give best solutions containing 500 and 50 p.p.m. of the test compound. Specimens of the root-knot nematode *Meloidogyne incognita* were extracted from the roots of infected tomato plants and placed in the various test solutions. The nematodes were allowed to remain in the solutions for 24 hours at 23° C. and were then transferred to distilled water. The mobility of the nematodes was observed after a further 24 hours. The results of these tests are set out in the following Table 3.

TABLE 3

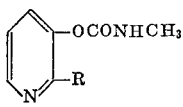

| Compound R | Concentration, p.p.m. | Percent mobile nematodes, after 24 hrs |
|---|---|---|
| —SC(CH$_3$)$_3$ | 500 | 0 |
|  | 50 | 1 |
| —SC$_2$H$_5$ | 500 | 1 |
|  | 50 | 1 |
| —CH$_2$SCH$_3$ | 500 | 0 |
|  | 50 | 8 |
| —CH$_2$SCH(CH$_3$)$_2$ | 500 | 0 |
|  | 50 | 8 |
| —CH$_2$SC$_2$H$_5$ | 500 | 0 |
|  | 50 | 10 |
| Control | (¹) | 84 |

¹ 0.5% acetone.

EXAMPLE X

Fungicidal activity

The fungicidal activity of the compounds of the invention was tested as follows:

Intact leaves or leaf pieces of vine, potato, wheat and cucumber were supported on water-saturated seed germination pads in 9 cm. petri dishes and were sprayed with aqueous suspensions contaianing 1,000 p.p.m. of the test compound. The leaves or leaf pieces were allowed to dry and were then inoculated with spores of *Plasmopara viticola* (vine downy mildew), *Phytophthora infestans* (potato late blight), *Puccina recondita* (brown wheat rust) and *Erysiphe cichoracearum* (cucumber powdery mildew) respectively. Observations on the development of disease symptoms were made after 2–7 days.

The results of the test are set out in Table 4, in which a result 2 indicates more than 80% control of the fungal disease, a result 1 indicates 50–80% control and a result 0 indicates less than 50% control.

TABLE 4

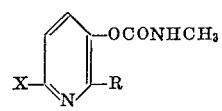

| Compound | | Fungicidal activity | | | |
|---|---|---|---|---|---|
| R | X | P. viticola | P. infestans | P. recondita | E. cichoracearum |
| —SC$_2$H$_5$ | H | 2 | 2 | 2 | 1 |
| —SC(CH$_3$)$_3$ | H | 2 | 2 | 2 | 2 |
| —SC(CH$_3$)$_3$ | CH$_3$ | 2 | 2 | 2 | 0 |
| —CH$_2$SC$_2$H$_5$ | H | 2 | 2 | 2 | 1 |
| —CH$_2$SCH(CH$_3$)$_2$ | H | 2 | 2 | 2 | 0 |
| —CH$_2$SCH$_3$ | H | 2 | 2 | 2 | 0 |
| —OCH$_3$ | H | 2 | 2 | 2 | 0 |
| —SCH$_2$CH$_2$CN | H | 2 | 2 |  | 0 |
| —OC$_2$H$_5$ | H | 2 | 2 | 2 | 0 |
| —OCH(CH$_3$)$_2$ | H | 2 | 2 |  | 2 |
| —SCH$_2$CH=CH$_2$ | H | 2 | 2 | 2 | 0 |
| —SCH$_3$ | H | 2 | 2 | 2 | 0 |
| —CH(OCH$_3$)$_2$ | H | 1 | 2 |  | 1 |

We claim as our invention:

1. A compound defined by the formula

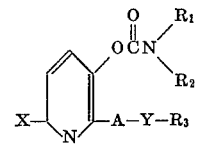

wherein R$_1$, R$_2$ and X each individually is hydrogen or alkyl of up to 8 carbon atoms; A represents a covalent bond or methylene; Y is —O— or —S— and R$_3$ is alkyl of up to 4 carbon atoms, optionally substituted by cyano, or is allyl.

2. A compound according to claim 1 wherein R$_1$ is hydrogen, R$_2$ is alkyl of 1–6 carbon atoms, X is hydrogen, A is a covalent bond and R$_3$ is alkyl of 1–6 carbon atoms.

3. A compound according to claim 2 wherein Y is —S—.

4. 2-methylthio-3-(N-methylcarbamoyloxy)pyridine.

References Cited

UNITED STATES PATENTS 2,512,732    6/1950    Aeschlimann et al.    260—295 CA 3,501,485    3/1970    Shimamoto et al.    260—295 CA ALAN L. ROTMAN, Primary Examiner U.S. Cl. X.R.

260—294.9, 294.8 D, 295 CA, 295.5 C; 424—266